Figure 2:
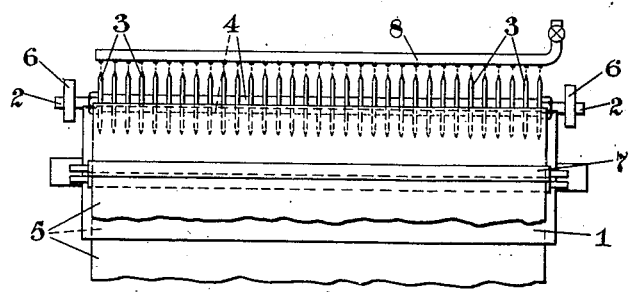

June 4, 1935.   U. PESTALOZZA   2,003,721

MANUFACTURE OF THREADS OR STRIPS OF RUBBER OR THE LIKE

Filed Aug. 4, 1932

Inventor
Ugo Pestalozza
By Watson, Cait, Morse & Grindle
Attys.

Patented June 4, 1935

2,003,721

UNITED STATES PATENT OFFICE 2,003,721

MANUFACTURE OF THREADS OR STRIPS OF RUBBER OR THE LIKE

Ugo Pestalozza, Milan, Italy, assignor to Società Italiana Pirelli, Milan, Italy Application August 4, 1932, Serial No. 627,532 In Great Britain August 4, 1931

12 Claims. (Cl. 18—54)

This invention is for improvements in and relating to the manufacture of elastic threads or strips of rubber or the like, more particularly such threads or strips having rectangular cross-section.

Rubber threads and strips as at present manufactured are generally cut from sheet rubber calendered from a rubber mixing consisting of ordinary coagulated rubber, generally having sulphur or other vulcanizing agents, fillers, colouring matter and other necessary ingredients incorporated with it. The mixing is calendered to a sheet of the required thickness and the sheet is wound on to a drum, suitable liners being usually interposed between the adjacent layers of the sheet on the drum. The sheet in position on the drum is then vulcanized. The vulcanized sheet is unwound from the drum and wound on to a revolving cylinder covered by a suitable plastic material and is thereon cut into strips or threads by means of knives. The strips or threads so cut from the rubber sheet are then unwound from the revolving cylinder and submitted to certain finishing operations.

According to the present invention, there is provided a process for the manufacture of elastic rubber threads or strips by cutting from a parent sheet of coherent precoagulated dispersion-rubber, wherein said parent sheet contains a substantial proportion of water uniformly incorporated in its mass for example and preferably is a sheet of rubber which has been produced by the heat-deposition process described in United States Patent No. 1,717,248 or one or other of the heat-deposition processes described in British patent specifications Nos. 292,964, 347,691 and 351,012, the said sheet being used while still containing a large proportion—e. g. up to 80%—of the water of the dispersion.

The heat-deposition processes referred to above are all of the same general type; that is to say, they are all characterized by the procedure which consists in bringing a heat-destabilized aqueous dispersion of rubber into contact with a surface heated to the temperature of coagulation of the dispersion so that by transmission of heat from this surface to the layer of dispersion immediately in contact with it there is caused to form in situ upon the surface a coherent and compact coagulum of rubber containing more or less of the water of the dispersion uniformly distributed through its mass according to the exact procedure employed. Hereinafter, therefore, in the accompanying statement of claim, the said processes will for brevity be referred to as heat-deposition processes of the type specified.

It will be understood that by "dispersion rubber" is meant rubber which has been produced directly from rubber latex or a like aqueous dispersion, and that the term "precoagulated" is intended to connote a condition of complete coagulation of the rubber sheet prior to its being brought into contact with the cutting knives by which the sheet is cut into threads or strips.

It is found that by operating in this manner, the particular form of parent sheet rubber which is used is possessed of considerable stiffness and can, therefore, be handled without becoming deformed and without losing its thickness during the various operations of the process, and in addition said parent sheet offers very little resistance to the cutting action of the knives by which the sheet is divided into strips or threads; small circular rotary knives, provided they rotate in a direction peripherally opposed to the relative movement of the sheet past them, cut lightly into the sheet, dividing it and giving such regular cuts that an extremely uniform rectangular cross-section of the threads or strips is obtained.

Moreover, the threads or strips produced are mutually adherent to one another by reason of the natural adhesiveness of their freshly cut surfaces and it is found that the remarkable cleanness and regularity of cut just referred to which is possible by the use in accordance with the present invention of a parent sheet of dispersion rubber containing, uniformly distributed throughout its mass, a substantial proportion of the water of the initial dispersion from which the sheet has been produced, enables the cut surfaces of the severed threads, provided the latter are supported upon leaving the severing means in contact with one another side by side, to mate perfectly with one another with the result that the threads or strips temporarily reunite by light adherence along their cut surfaces to the form of a unitary sheet, the degree of adhesion of the individual threads to one another to form the re-united sheet being such as to enable the sheet to be readily manipulated over rollers and the like during the course of subsequent handling and treatment of the sheet, for example during the steps of dehydration and vulcanization, while at the same time the said degree of adhesion is insufficient to prevent the individual threads or strips from being readily pulled apart from one another, either upon completion of the after-treatment referred to or at some stage during said treatment.

The present invention further comprises therefore a process for making elastic rubber threads or strips which consists in simultaneously cutting a plurality of threads or strips from a parent sheet of pre-coagulated dispersion-rubber uniformly incorporating in its mass a large proportion of water as aforesaid, the freshly cut threads or strips being so supported in contact with one another side by side during their relative movement away from the cutting knives as to be caused lightly by the adherence of their cut-surfaces temporarily to re-unite into a unitary sheet for subsequent handling and treatment.

The actual percentage of water in the rubber sheet should be such that the sheet possesses the stiffness, resistance to lessening of thickness and amenability to cutting referred to above; it may vary within fairly wide limits, e. g. from 20 to 60 per cent., according to the proportion of vulcanizing agents and other ingredients incorporated with the rubber and according to the method of preparation of the sheet, for example, to the coagulants used. The requisite condition of hydration, however, can be determined in any given case by a simple preliminary test.

The rubber sheet which is used according to the present invention may be produced from any suitable aqueous dispersion of rubber. Highly satisfactory results have been obtained with rubber sheet which has been produced from latex both normal and concentrated. The latex may contain vulcanizing agents, fillers, reinforcing agents, softeners, dyestuffs, dispersing agents, preservatives, or other added ingredients, suspended or dispersed in it. Aqueous dispersions of rubber other than latex may, however, be used in the production of sheet. Thus, an artificial dispersion of coagulated rubber or synthetic rubber or reclaimed rubber or any two or more of these admixed together in any desired proportion, may be used. Also, such other dispersions may be admixed with rubber latex. Moreover, a pre-concentrated dispersion may be employed, if desired, for example, pre-concentrated latex. Also, a pre-vulcanized dispersion may be used, in which event the step of vulcanizing the cut threads or strips may become eliminated from the process.

The preferred form of rubber sheet for use according to the present invention is rubber sheet which has been produced in accordance with the principle of the process described and claimed in the specification of the aforesaid United States Patent No. 1,717,248 or by the process described in the specification of one or other of the British patents referred to Nos. 292,964, 351,012 and 347,691, more especially the last of these three. If necessary, in order to preserve the initial water content of the freshly coagulated sheet, the latter may be kept immersed in water.

The invention further comprises an improved method of performing the cutting operation, according to which, during or immediately after the cutting of the rubber sheet by means of a series of knives operating simultaneously upon the sheet and spaced from one another in a direction perpendicular to their lines of action, the cut-surfaces of the sheet are wetted with a suitable liquid adapted to reduce the mutual adherence of these surfaces. The liquid used may be a sufficiently concentrated solution of glucose, sugar, dextrine, fecula, starch or the like. These substances are not adsorbed by rubber, are not subject to alteration and do not react on rubber at vulcanization temperatures.

The purpose of wetting the cut surfaces of the sheet with such a solution will appear from the following description of one way in which the invention may be carried into effect.

Figure 1:
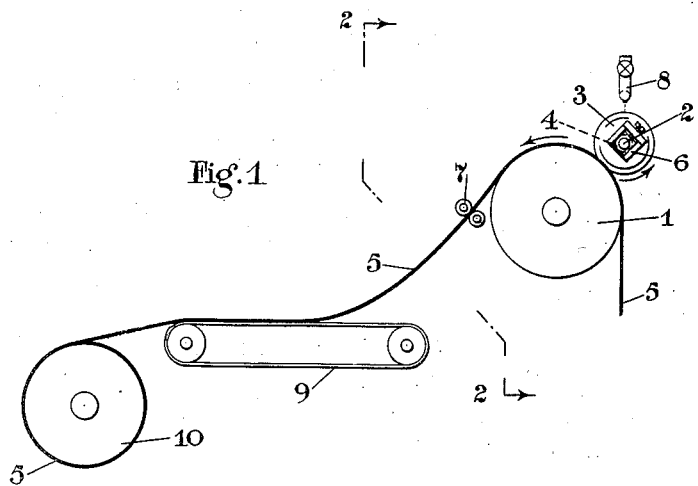

An actual embodiment of the invention will now be described by way of example with reference to the accompanying drawing, which, it is to be understood, is purely diagrammatic, and of which Figure 1 is a longitudinal section through a form of apparatus suitable for carrying the invention into effect; and Figure 2 is a front view and transverse section of the apparatus, taken along the section line 2—2 of Figure 1.

Like reference characters indicate like parts in the two figures.

Rubber sheet prepared in accordance with the process described, for example, in the aforesaid British patent specification No. 347,691 is progressively drawn on to the plastic-coated surface of a rotating cylinder 1, above which, extending parallel to the axis of the cylinder, is a rotating shaft 2 carrying a series of thin steel circular knives 3 which rotate with the shaft and which are spaced apart from one another along the shaft by spacing rings 4.

The knives 3 rotate at such a speed that their peripheral velocity is approximately from 30 to 100 feet per minute. The direction of rotation of the knives is the same as that of the cylinder 1 feeding the rubber sheet 5 past the knives so that the cutting action of the knives is opposed to the forward feed of the rubber sheet.

The knife shaft 2 is mounted in adjustable bearings 6 which permit the shaft to be raised or lowered in relation to the cylinder 1 carrying the rubber sheet. In practice the position of the knife shaft should be such that the knives 3 penetrate slightly into the plastic surface coating of the cylinder.

The rotating cylinder 1, as will be appreciated, continuously feeds the rubber sheet 5 wound upon it past the cutting knives 3. The sheet, having passed the knives, is maintained in adherence to the surface of the cylinder 1 until a small roller 7 pulls it off regularly along the whole width of the sheet.

During the cutting action of the knives, the latter are continuously lubricated with a solution as stated above which is fed to the knives from a perforated pipe 8 situated above them. The said solution thus fed to the knives flows downwardly to the rubber sheet on the cylinder 1 and becomes uniformly spread by the knives 3 over the cut surfaces of the sheet.

By thus wetting the cut surfaces of the rubber sheet 5 their tendency to stick together too firmly is prevented, but the said surfaces are permitted to adhere to one another with sufficient firmness to enable the cut sheet to be handled in the subsequent operations as if it were a single undivided sheet, that is to say, without causing separation of the threads or strips from one another. The individual threads or strips, however, can afterwards, both before and after vulcanization, be readily separated from one another at will by applying a slight pulling stress to separate them, and this can be accomplished without incurring deformation of the threads or strips.

The cut rubber sheet passes from the small roller 7 aforesaid on to a roller or belt conveyor 9 which conveys the sheet to a second rotating cylinder 10 on to which it becomes wound. The rubber sheet is then vulcanized on this cylinder.

If necessary, the cut sheet may be dried prior to the vulcanizing operation.

Following upon the vulcanizing step, the rubber sheet is withdrawn from the vulcanizing cylinder and submitted to warping and finishing as usual. Before, or during, these latter mentioned operations, the cut sheet may, if necessary, to prevent undue adherence of the individual threads or strips to one another, be sprayed or otherwise wetted again with the solution of glucose or the like.

By operating in accordance with this invention, I have succeeded even with rubber sheet produced from previously vulcanized dispersions in cutting perfectly uniform threads and strips, whereas this is not possible when cutting from sheets which have been produced from latex or other aqueous dispersions and which have been dried, and is still less possible using sheets, vulcanized or unvulcanized, prepared from ordinary coagulated rubber or a rubber mixing.

What I claim and desire to secure by Letters Patent is:—

1. A process for the manufacture of elastic rubber threads or strips which comprises simultaneously cutting a plurality of threads or strips from a parent sheet of coherent pre-coagulated dispersion-rubber uniformly incorporating in its mass a large proportion of water, the freshly cut threads or strips being so supported in contact with one another side by side during their relative movement away from the cutting means as to be caused lightly by the adherence of their cut surfaces temporarily to re-unite into a unitary sheet for subsequent handling and treatment, and the freshly cut surfaces of the sheet being wetted with a liquid adapted to reduce the mutual adherence of the said surfaces.

2. A process for the manufacture of elastic rubber threads or strips as specified in claim 1, wherein the parent sheet is cut by means of a series of knives operating simultaneously upon the sheet and spaced from one another at the cutting edges in a direction perpendicular to their lines of action by a distance equal to the width of the threads or strips to be cut from the sheet.

3. A process for the manufacture of elastic rubber threads or strips as claimed in claim 1, wherein the liquid with which the freshly cut surface of the parent sheet is wetted is a concentrated solution of glucose.

4. A process for the manufacture of elastic rubber threads or strips as claimed in claim 1, wherein the liquid with which the freshly cut surface of the parent sheet is wetted is a concentrated solution of sugar.

5. A process for the manufacture of elastic rubber threads or strips as claimed in claim 1, wherein the liquid with which the freshly cut surface of the parent sheet is wetted is a concentrated solution of dextrine.

6. A process for the manufacture of elastic rubber threads or strips as claimed in claim 1, wherein the liquid with which the freshly cut surface of the parent sheet is wetted is a solution of a substance substantially inert towards rubber both physically and chemically even at usual rubber vulcanization temperatures.

7. A process for the manufacture of elastic rubber threads or strips by cutting from a parent sheet of coherent completely pre-coagulated dispersion-rubber, which consists in using a parent sheet containing, uniformly incorporated in its mass, a substantial proportion of the order of from 20–60% (reckoned upon the total weight of the sheet) of the water of the dispersion from which the sheet has been obtained.

8. A process for the manufacture of elastic rubber threads or strips which comprises simultaneously cutting a plurality of threads or strips from a parent sheet of coherent completely pre-coagulated dispersion-rubber containing, uniformly incorporated in its mass, a substantial proportion of the order of from 20–60% (reckoned upon the total weight of the sheet) of the water of the dispersion from which the sheet has been obtained, the freshly cut threads or strips being so supported in contact with one another side by side during their relative movement away from the cutting means as to be caused lightly, by their adherence at the cut surfaces, temporarily to re-unite into a unitary sheet for subsequent handling and treatment.

9. A method of carrying into effect the process claimed in claim 8, which comprises cutting the parent sheet in position upon a plastic-coated surface of a rotating cylinder, above which, extending parallel to the axis of the cylinder is a shaft carrying a series of axially spaced circular knives rotatable upon the shaft in a sense peripherally opposed to the direction of rotation of the cylinder, the cutting edge of the knives penetrating completely through the sheet in position upon the cylinder and the threads or strips upon leaving the knives being maintained in position still upon the cylinder side by side and in contact with one another for a distance around the circumference of the cylinder sufficient to result in their lightly re-uniting to form a unitary sheet.

10. A method of carrying into effect the process claimed in claim 8, which comprises cutting the parent sheet in position upon a plastic-coated surface of a rotating cylinder, above which, extending parallel to the axis of the cylinder, is a shaft carrying a series of axially spaced circular knives rotatable upon the shaft in a sense peripherally opposed to the direction of rotation of the cylinder, and therefore to the movement of the rubber sheet thereon, and at a peripheral speed of from 30–100 feet per minute, the cutting edge of the knives penetrating completely through the sheet in position upon the cylinder and slightly into the plastic surface-coating thereon and the threads or strips upon leaving the knives being maintained in position still upon the cylinder side by side and in contact with one another for a sufficient distance around the periphery of the cylinder to result in their lightly re-uniting to form a unitary sheet.

11. A process for the manufacture of elastic rubber threads or strips as claimed in claim 8, wherein the parent rubber sheet employed is a sheet of dispersion-rubber produced by a heat deposition process of the type hereinbefore specified.

12. A process for the manufacture of elastic rubber threads or strips by cutting from a parent sheet of coherent completely pre-coagulated dispersion-rubber which consists in using a parent sheet produced by a heat-deposition process of the type hereinbefore specified and containing, uniformly distributed throughout its mass, a substantial proportion of the order of from 20–60% (reckoned upon the total weight of the sheet) of the water of the parent dispersion from which the sheet was produced.

UGO PESTALOZZA.